United States Patent
Oh et al.

(10) Patent No.: US 10,290,388 B2
(45) Date of Patent: May 14, 2019

(54) CONDUCTIVE RESIN COMPOSITION AND PLASTIC MOLDED PRODUCT USING THE SAME

(71) Applicant: Korea Kumho Petrochemical Co., Ltd., Seoul (KR)

(72) Inventors: Dong Hoon Oh, Daejeon (KR); Hyun Kyung Sung, Daejeon (KR); Sang Hyo Ryu, Seoul (KR); Chung Heon Jeong, Daejeon (KR); Ki Hong Kim, Seoul (KR); Dong Hwan Kim, Daejeon (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 0 days.

(21) Appl. No.: 15/435,602

(22) Filed: Feb. 17, 2017

(65) Prior Publication Data

US 2017/0243669 A1 Aug. 24, 2017

(30) Foreign Application Priority Data

Feb. 19, 2016 (KR) ........................ 10-2016-0019975

(51) Int. Cl.
*H01B 1/24* (2006.01)
*C08K 3/04* (2006.01)
*B82Y 40/00* (2011.01)
*B82Y 30/00* (2011.01)

(52) U.S. Cl.
CPC ................. *H01B 1/24* (2013.01); *C08K 3/04* (2013.01); *B82Y 30/00* (2013.01); *B82Y 40/00* (2013.01); *Y10S 977/753* (2013.01)

(58) Field of Classification Search
None
See application file for complete search history.

(56) References Cited

U.S. PATENT DOCUMENTS

| | | | | |
|---|---|---|---|---|
| 2002/0127171 | A1* | 9/2002 | Smalley | B82Y 30/00 423/447.6 |
| 2008/0293853 | A1* | 11/2008 | Wolf | B82Y 30/00 524/81 |
| 2010/0163795 | A1* | 7/2010 | Kim | C08K 7/02 252/299.6 |
| 2011/0171364 | A1* | 7/2011 | Xing | B82Y 30/00 427/77 |
| 2012/0292578 | A1* | 11/2012 | Bacher | B82Y 30/00 252/511 |

FOREIGN PATENT DOCUMENTS

| | | |
|---|---|---|
| JP | 2013-018673 | 1/2013 |
| KR | 10-2012-0113218 | 10/2012 |
| KR | 20150133421 A * | 11/2015 |

OTHER PUBLICATIONS

Nagy et al. Large scale snythesis of carbon nanotubes and their composite materials. (Year: 2001).*

* cited by examiner

*Primary Examiner* — Tanisha Diggs
(74) *Attorney, Agent, or Firm* — H.C. Park & Associates, PLC

(57) ABSTRACT

According to one aspect of the present invention, carbon nanotubes whose diameter, length, crystallinity, purity and the like are adjusted to predetermined ranges are added to a thermoplastic resin, and thus the thermoplastic resin can be provided with improved electrical conductivity.

4 Claims, 4 Drawing Sheets

CONDUCTIVE RESIN COMPOSITION AND PLASTIC MOLDED PRODUCT USING THE SAME

CROSS-REFERENCE TO RELATED APPLICATION

This application claims priority from and the benefit of Korean Patent Application No. 10-2016-0019975, filed on Feb. 19, 2016, which is hereby incorporated by reference for all purposes as if fully set forth herein.

BACKGROUND

Field

Exemplary embodiments of the present invention relate to a conductive resin composition including carbon nanotubes whose diameter, length, crystallinity, purity and the like are adjusted to predetermined ranges, and a plastic molded product using the same.

Discussion of the Background

A thermoplastic resin refers to a plastic which softens when heated and thus exhibits plasticity, and solidifies when cooled. Such a thermoplastic resin exhibits excellent processability and moldability and therefore has been widely applied to various household goods, office automation equipment, electric and electronic products, automobile parts or the like.

In addition, attempts have been continuously made to use a thermoplastic resin as a high-value-added material by providing specific properties to a thermoplastic resin depending on the type and characteristics of products using such a thermoplastic resin.

In particular, when a thermoplastic resin is applied to the field in which friction occurs between resin products or a resin product and other materials, a product is damaged and contaminated due to an electrification phenomenon, and thus there is a need to impart electrical conductivity to a thermoplastic resin.

In this way, for imparting electrical conductivity to a conventional thermoplastic resin, a conductive filler such as carbon black, graphite, carbon fibers, metal powder, metal-coated inorganic powder, metallic fibers or the like has been used.

However, in order to derive meaningful results for imparting electrical conductivity, a conductive filler is added at about 20 wt % or more with respect to a thermoplastic resin, which consequently leads to degradation in mechanical properties such as wear resistance of a thermoplastic resin.

In order to solve this problem, various attempts have recently been made to simultaneously implement mechanical properties and electrical conductivity of a thermoplastic resin by using carbon nanotubes as a conductive filler.

However, when carbon nanotubes are added to impart electrical conductivity to a thermoplastic resin, particularly, an olefin-based polymer resin, sufficient electrical conductivity is not implemented and an excessive amount of carbon nanotubes is also required compared to when other materials are used. Therefore, a solution to this problem is being needed.

The above information disclosed in this Background section is only for enhancement of understanding of the background of the inventive concepts, and, therefore, it may contain information that does not form the prior art that is already known in this country to a person of ordinary skill in the art

SUMMARY

Exemplary embodiments of the present invention provide a conductive resin composition in which a small amount of carbon nanotubes as a conductive filler is added to a thermoplastic resin but a thermoplastic resin still can be provided with excellent electrical conductivity.

Exemplary embodiments of the present invention also provide a conductive resin composition which includes a carbon nanotube agglomerate composed of, in a bundle form, a plurality of carbon nanotubes having an average outer diameter ranging from 8 to 50 nm and an average inner diameter of 40% or more of the average outer diameter; and a thermoplastic resin.

In one embodiment, the carbon nanotubes may have a Raman spectroscopy intensity ratio ($I_G/I_D$) of 1.0 or more.

In one embodiment, the carbon nanotubes may have a carbon purity of 95% or more.

In one embodiment, the carbon nanotube agglomerate may have an average bundle diameter ranging from 1 to 10 μm.

In one embodiment, the carbon nanotube agglomerate may have an average bundle length ranging from 30 to 100 μm.

In one embodiment, the carbon nanotube agglomerate may include oxygen at a content of 0.5 wt % or less.

In one embodiment, the carbon nanotube agglomerate may be included at a content of 0.1 to 30 wt % with respect to the total weight of the conductive resin composition.

In one embodiment, the thermoplastic resin may be an olefin-based polymer resin.

In one embodiment, the olefin-based polymer resin may be one selected from the group consisting of high-density polyethylene, low-density polyethylene, linear low-density polyethylene, a polyethylene copolymer, polypropylene, and a mixture of two or more thereof.

In one embodiment, the polyethylene copolymer may be one selected from the group consisting of ethylene vinyl acetate, ethylene butyl acrylate, ethylene ethyl acrylate, and a mixture of two or more thereof.

In another aspect of the present invention, there is provided a plastic molded product which includes the conductive resin composition.

In one embodiment, the plastic molded product may have a surface resistance ranging from $10^2$ to $10^{10}$ Ω/sq.

According to one aspect of the present invention, carbon nanotubes whose diameter, length, crystallinity, purity and the like are adjusted to predetermined ranges are added to a thermoplastic resin, and thus the thermoplastic resin can be provided with improved electrical conductivity.

Effects of the present invention are not limited to the above-described effects and it should be understood that all effects that can be inferred from a configuration of the invention disclosed in detailed descriptions or claims of the present invention are encompassed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
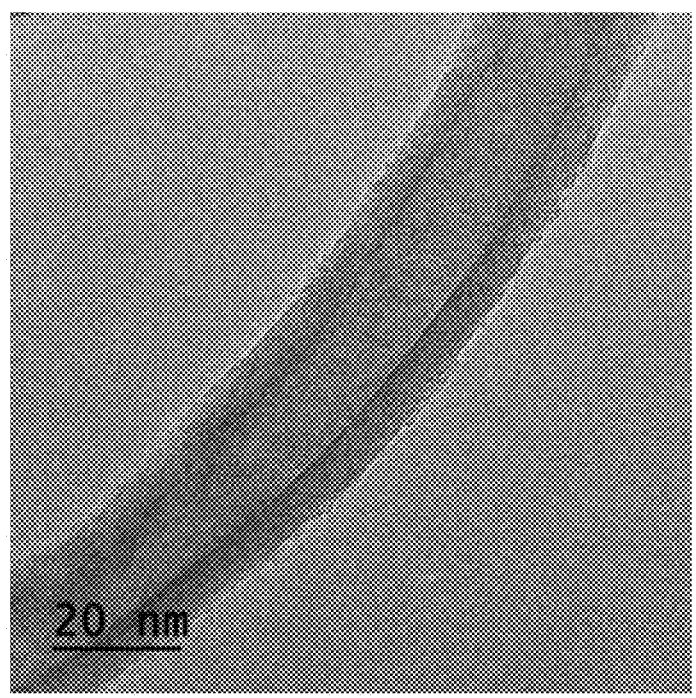
FIG. 1 is a transmission electron microscope (TEM) image of carbon nanotubes according to one embodiment of the present invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

Unless otherwise specified, the illustrated exemplary embodiments are to be understood as providing exemplary features of varying detail of various exemplary embodiments. When an exemplary embodiment may be implemented differently, a specific process order may be performed differently from the described order. For example, two consecutively described processes may be performed substantially at the same time or performed in an order opposite to the described order.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Hereinafter, embodiments of the present disclosure will be described in detail with reference to the accompanying drawings.

A conductive resin composition according to one aspect of the present invention may include a carbon nanotube agglomerate composed of, in a bundle form, a plurality of carbon nanotubes having an average outer diameter ranging from 8 to 50 nm and an average inner diameter of 40% or more of the average outer diameter; and a thermoplastic resin.

The carbon nanotubes are materials for imparting electrical conductivity to a nonconductive thermoplastic resin, particularly, an olefin-based polymer resin. When a resin composition to which the carbon nanotubes are added is molded, surface resistance of a plastic material thus manufactured significantly decreases, and thus electrical conductivity may be improved.

As a method of synthesizing the carbon nanotubes, an arc-discharge method, a pyrolysis method, a laser vaporization method, a plasma chemical vapor deposition method, a thermal chemical vapor deposition method or the like may be used, but all carbon nanotubes prepared without limitation in a synthesizing method may be used.

In addition, the carbon nanotubes may be one selected from the group consisting of single-walled carbon nanotubes, double-walled carbon nanotubes, multi-walled carbon nanotubes, hollow-tube-type carbon nanofibers (cup-stacked carbon nanofibers) in which a plurality of truncated conical graphene are laminated, and a mixture of two or more thereof depending on the number of walls. The carbon nanotubes may preferably be multi-walled carbon nanotubes having excellent ease of manufacture and economic feasibility, but the present invention is not limited thereto.

FIG. 1 is a transmission electron microscope (TEM) image of carbon nanotubes according to one embodiment of the present invention. Referring to FIG. 1, the carbon nanotube agglomerate may be present in a bundle form in which a plurality of single-strand carbon nanotubes having an average outer diameter ranging from 8 to 50 nm and an average inner diameter of 40% or more of the average outer diameter, preferably, ranging from 40 to 90% of the average outer diameter, are mutually agglomerated. The outer diameter means a diameter of a cross section of carbon nanotubes including a graphite layer constituting the wall of carbon nanotubes, and the inner diameter means a diameter of a cross section of a hollow tube excluding the graphite layer.

When the single-strand carbon nanotubes has an average outer diameter of less than 8 nm or greater than 50 nm, an average bundle diameter of a carbon nanotube agglomerate that is formed by agglomeration thereof is not adjusted to a range to be described below, and thus it is preferable that carbon nanotubes having an outer diameter within the above range be used. The term "bundle" used herein refers to a bundle or rope form in which a plurality of carbon nanotubes are arranged in parallel or are mutually entangled. In contrast, a state in which a plurality of carbon nanotubes are present without formation of a certain shape is referred to as "non-bundle-type".

The bundle-type carbon nanotube agglomerate may basically be present in the form in which a plurality of carbon nanotubes, preferably, a plurality of multi-walled carbon nanotubes are mutually agglomerated. Each carbon nanotube and agglomerate thereof may be in a linear form, a curved form or a mixed form thereof.

In addition, when the average inner diameter of the single-strand carbon nanotubes, that is, multi-walled carbon nanotubes is less than 40% of the average outer diameter, the internal volume of the carbon nanotubes decreases and thus electrical conductivity may be degraded. For this reason, the average inner diameter of the carbon nanotubes may be 40% or more of the average outer diameter.

Among methods of analyzing the structure of the carbon nanotubes, Raman spectroscopy for analyzing the surface state of carbon nanotubes may be usefully used. The term "Raman spectroscopy" used herein refers to a spectroscopic method for obtaining the frequency of a molecule in the Raman effect which is a phenomenon in which, when monochromatic excitation light such as laser light is radiated, scattered light having a difference as much as the frequency of a molecule is emitted. This Raman spectroscopy may be used to quantify and measure the crystallinity of the carbon nanotubes.

In the Raman spectrum of the carbon nanotubes, a peak present at a wave number of 1580±50 cm$^{-1}$ is referred to as a G-band and represents a sp$^2$ bond of carbon nanotubes, which indicates a carbon crystal having no structural defect. In addition, a peak present at a wave number of 1360±50 cm$^{-1}$ is referred to as a D-band and represents a sp$^3$ bond of carbon nanotubes, which indicates a carbon crystal having a structural defect.

Further, peak values of the G-band and the-D band are referred to as $I_G$ and $I_D$ respectively, and the crystallinity of carbon nanotubes can be quantified and measured through a Raman spectroscopy intensity ratio ($I_G/I_D$) which is a ratio of $I_G$ to $I_D$. That is, a higher Raman spectroscopy intensity ratio indicates carbon nanotubes with fewer structural defects. Therefore, when carbon nanotubes which exhibit the higher Raman spectroscopy intensity ratio are used, more excellent electrical conductivity may be implemented.

Specifically, a Raman spectroscopy intensity ratio ($I_G/I_D$) of the carbon nanotubes may be equal to or greater than 1.0. When the $I_G/I_D$ value of the carbon nanotubes is less than 1.0, the carbon nanotubes have poor crystallinity because a large amount of amorphous carbon is contained, and thus a weak effect of improving electrical conductivity may be exhibited upon mixing with a thermoplastic resin composition.

In addition, as a carbon content of carbon nanotubes is higher, they have fewer impurities such as catalysts, and thus excellent electrical conductivity may be implemented. Therefore, the carbon purity of the carbon nanotubes may be 95% or more, preferably 95 to 98%, and more preferably 96.5 to 97.5%.

When the carbon purity of the carbon nanotubes is less than 95%, a structural defect of the carbon nanotubes is induced, and thus the crystallinity thereof may be degraded and the carbon nanotubes may be easily cut or broken due to an external stimulus.

Figure 2:
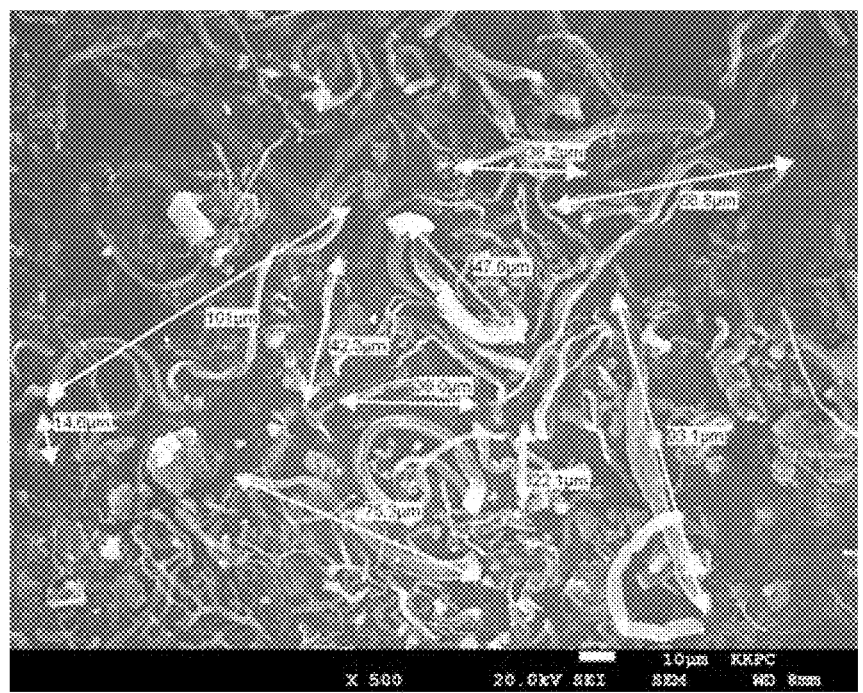
FIG. 2 is a scanning electron microscope (SEM) image illustrating the bundle length of a carbon nanotube agglomerate according to one embodiment of the present invention.
Figure 3:
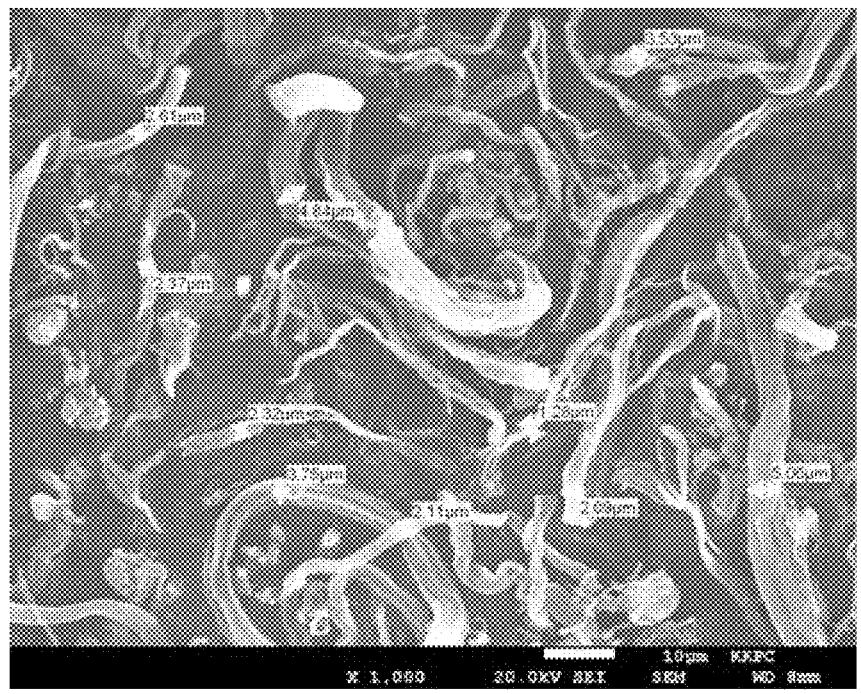
FIG. 3 is a SEM image illustrating the bundle diameter of a carbon nanotube agglomerate according to one embodiment of the present invention.

FIG. 2 and FIG. 3 are scanning electron microscope (SEM) images illustrating the bundle length and the bundle diameter of a carbon nanotube agglomerate according to one embodiment of the present invention, respectively.

Referring to FIG. 2 and FIG. 3, the average bundle diameter of the carbon nanotube agglomerate that is formed by agglomerating the single-strand carbon nanotubes in a bundle form as described above may be 1 to 10 μm, preferably 3 to 5 μm, and more preferably 3.5 to 4.5 μm. Also, the average bundle length thereof may be 30 to 100 μm, preferably 40 to 60 μm, and more preferably 45 to 55 μm.

The carbon nanotube agglomerate is dispersed in a thermoplastic resin to form a three-dimensional network structure, and as such a network structure is firmly formed, electrical conductivity may be improved. In particular, when the average bundle diameter and the average bundle length of the carbon nanotube agglomerate are adjusted to predetermined ranges, the network structure may be firmly formed.

In this case, when the average bundle diameter of the carbon nanotube agglomerate is less than 1 μm or the average bundle length thereof is greater than 100 μm, dispersibility is degraded and thus electrical conductivity of the conductive resin composition may not be uniform throughout the composition. On the other hand, when the average bundle diameter thereof is greater than 10 μm or the average bundle length thereof is less than 30 μm, the network structure becomes unstable and thus electrical conductivity may be degraded.

In addition, as an oxygen content of the carbon nanotube agglomerate is higher, electrical conductivity decreases, and therefore carbon nanotubes having a low oxygen content may be used. Specifically, an oxygen content of the carbon nanotube agglomerate may be 0.5 wt % or less, preferably, 0.1 to 0.5 wt % with respect to the total weight of the carbon nanotube agglomerate.

The carbon nanotube agglomerate may be included at 0.1 to 30 wt % with respect to the total weight of the conductive resin composition. When a content of the carbon nanotube agglomerate is less than 0.1 wt %, a weak effect of providing electrical conductivity to a thermoplastic resin may be exhibited. On the other hand, when a content thereof is greater than 30 wt %, mechanical properties of the resin composition may be degraded.

Meanwhile, the thermoplastic resin may be an olefin-based polymer resin which exhibits less change in properties in a relatively wide temperature range compared to other materials and has excellent moldability, weather resistance, chemical resistance and the like.

For example, the olefin-based polymer resin may be one selected from the group consisting of high-density polyethylene, low-density polyethylene, linear low-density polyethylene, a polyethylene copolymer, polypropylene, and a mixture of two or more thereof, and preferably a polyethylene-based material, but the present invention is not limited thereto.

In addition, the polyethylene copolymer may be one selected from the group consisting of ethylene vinyl acetate, ethylene butyl acrylate, ethylene ethyl acrylate, and a mixture of two or more thereof, but the present invention is not limited thereto.

That is, the olefin-based polymer resin may be a homopolymer in which one monomer is polymerized alone or a copolymer in which two or more monomers are polymerized. In this case, the copolymer may be an alternating copolymer, a random copolymer, a block copolymer, or a graft copolymer without limitation in a polymerization type.

Meanwhile, the conductive resin composition may further include one or more additives selected from the group consisting of a flame retardant, an impact modifier, a flame retardant aid, a lubricant, a plasticizer, a thermal stabilizer, an anti-dropping agent, an antioxidant, a compatibilizer, a photostabilizer, a pigment, a dye, an inorganic additive, and an anti-dripping agent depending on the purpose of use thereof.

The additives may be included at 0.1 to 10 wt % with respect to the total weight of the conductive resin composition. When a content of the additive is less than 0.1 wt %, a suitable effect for the purpose of use may not be implemented. On the other hand, when a content thereof is greater than 10 wt %, intrinsic properties of the thermoplastic resin may be degraded.

The conductive resin composition may be made into a plastic molded product through injection molding, extrusion molding or the like, and may be used for various household goods, office automation equipment, electric and electronic products, automobile parts or the like by using, as a base material, an olefin-based polymer resin which is widely applicable.

In addition, the plastic molded product manufactured using the conductive resin composition may be made to have a surface resistance ranging from $10^2$ to $10^{10}$ Ω/sq by adjusting a content of the carbon nanotubes depending on application fields, and particularly, may be made to have a surface resistance ranging from $10^2$ to $10^8$ Ω/sq in a field where antistatic properties or excellent electrical conductivity is required.

Hereinafter, embodiments of the invention will be described in detail with reference to the accompanying drawings.

EXAMPLE 1

4 parts by weight of a carbon nanotube agglomerate composed of, in a bundle form, a plurality of multi-walled carbon nanotubes (MWCNTs) having an average outer diameter of 25.8 nm, an average inner diameter of 13.6 nm, a Raman spectroscopy intensity ratio of 1.25, and a carbon purity of 96.5% was put into a side feeder of a twin screw extruder, and 96 parts by weight of polyethylene was put into a main hopper thereof. Afterward, the two substances were melt-mixed at a mixing speed of 200 rpm and a process temperature of 250° C. to prepare a conductive resin composition.

Referring to FIG. 1 to FIG. 3 again, the carbon nanotube agglomerate had an average bundle diameter of 3.5 μm, an average bundle length of 50 μm, and an oxygen content of 0.26 wt %.

In addition, the Raman spectroscopy intensity ratio was measured at a laser wavelength of 532 nm using the DXR Raman microscope (commercially available from Thermo Electron Scientific Instruments LLC).

EXAMPLE 2

A conductive resin composition was prepared in the same manner as in Example 1 except that addition amounts of the carbon nanotube agglomerate and polyethylene were 5 parts by weight and 95 parts by weight, respectively.

EXAMPLE 3

A conductive resin composition was prepared in the same manner as in Example 1 except that addition amounts of the carbon nanotube agglomerate and polyethylene were 3 parts by weight and 97 parts by weight, respectively.

COMPARATIVE EXAMPLE 1

4 parts by weight of a carbon nanotube agglomerate composed of, in a bundle form, a plurality of MWCNTs having an average outer diameter of 15 nm, an average inner diameter of 4.7 nm, a Raman spectroscopy intensity ratio of 0.80, and a carbon purity of 94.3% was put into a side feeder of a twin screw extruder, and 96 parts by weight of polyethylene was put into a main hopper thereof. Afterward, the two substances were melt-mixed at a mixing speed of 200 rpm and a process temperature of 250° C. to prepare a conductive resin composition.

Figure 4:
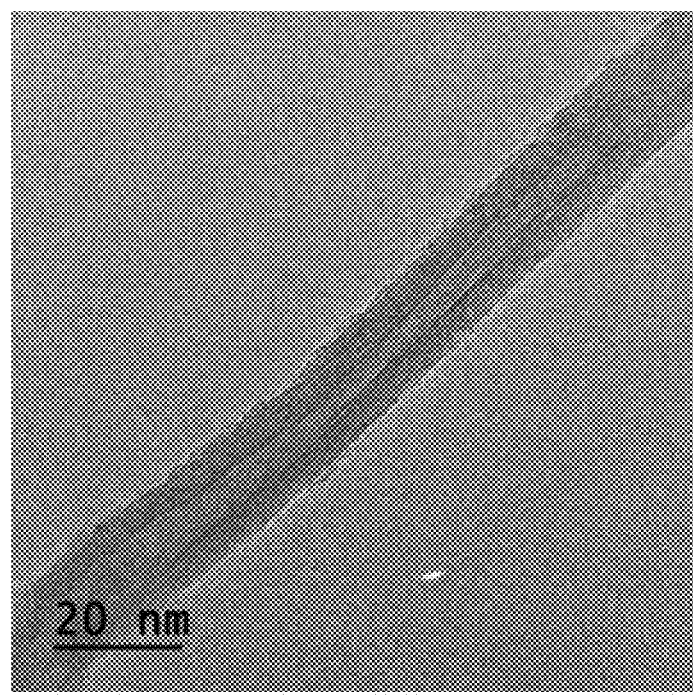
FIG. 4 is a TEM image of carbon nanotubes according to one comparative example of the present invention.
Figure 5:
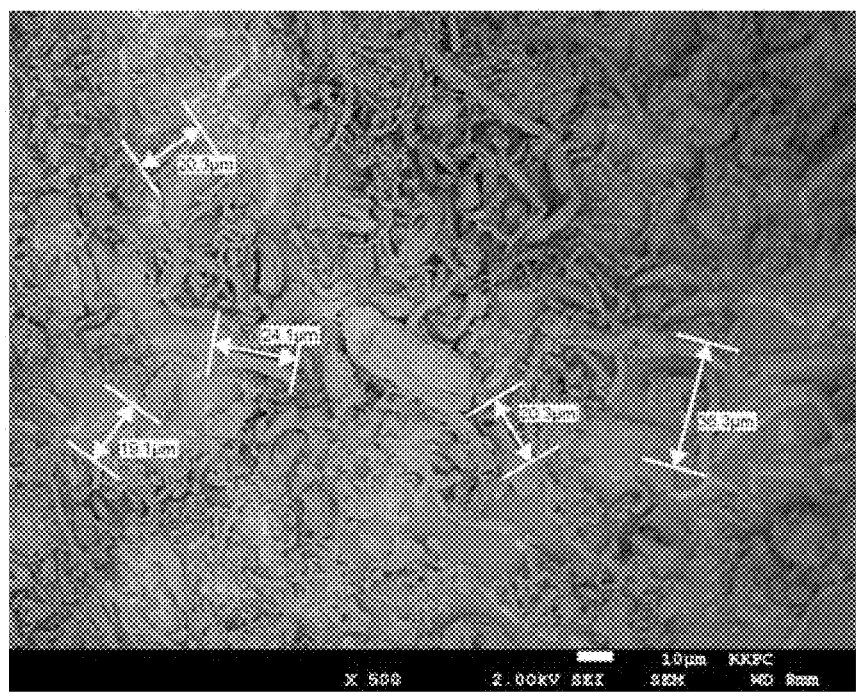
FIG. 5 is a SEM image illustrating the bundle length of a carbon nanotube agglomerate according to one comparative example of the present invention.
Figure 6:
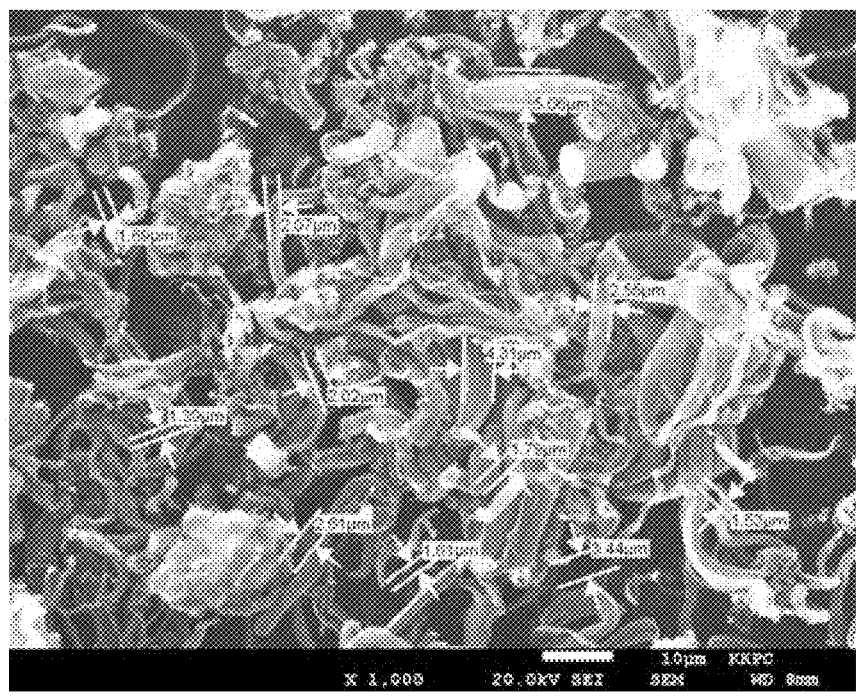
FIG. 6 is a SEM image illustrating the bundle diameter of a carbon nanotube agglomerate according to one comparative example of the present invention.

FIG. 4 is a TEM image of carbon nanotubes according to one comparative example of the present invention, and FIG. 5 and FIG. 6 are SEM images illustrating the bundle length and the bundle diameter of a carbon nanotube agglomerate according to one comparative example of the present invention, respectively. Referring to FIG. 4 to FIG. 6, the carbon nanotube agglomerate had an average bundle diameter of 2.5 μm, an average bundle length of 24 μm, and an oxygen content of 0.47 wt %.

COMPARATIVE EXAMPLE 2

A conductive resin composition was prepared in the same manner as in Comparative Example 1 except that addition amounts of the carbon nanotube agglomerate and polyethylene were 5 parts by weight and 95 parts by weight, respectively.

COMPARATIVE EXAMPLE 3

A conductive resin composition was prepared in the same manner as in Comparative Example 1 except that addition amounts of the carbon nanotube agglomerate and polyethylene were 3 parts by weight and 97 parts by weight, respectively.

EXPERIMENTAL EXAMPLE

Measurement of Electrical Conductivity of Conductive Resin Composition Depending on Type and Content of Carbon Nanotubes Conductive resin compositions according to Examples 1 to 3 and Comparative Examples 1 to 3 were injection-molded at 210° C. using a hydraulic injection molding machine to manufacture injection-molded products in a rectangular shape having a size of 30 cm (width) and 20 cm (length).

Figure 7:
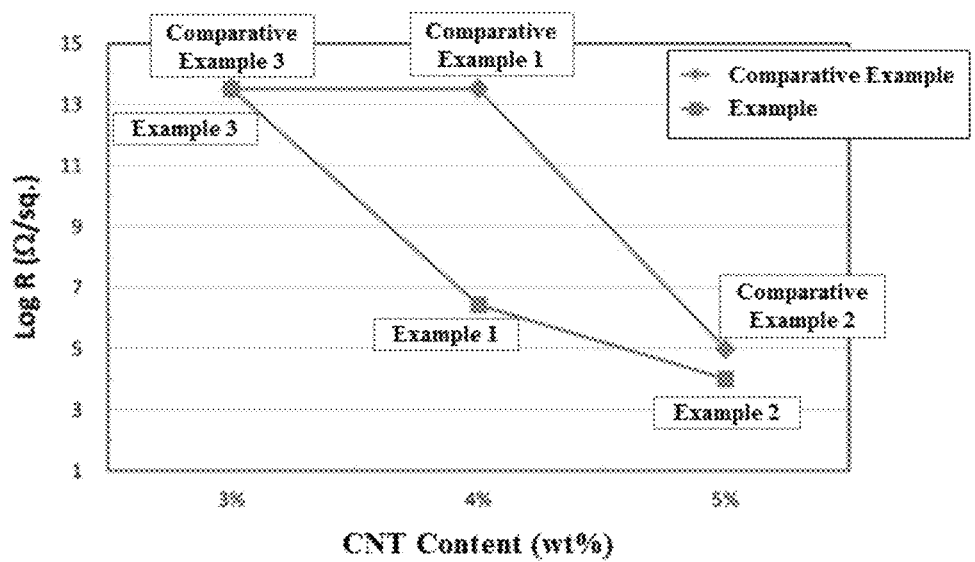
FIG. 7 is a graph illustrating surface resistance values of molded products manufactured using conductive resin compositions according to embodiments and comparative examples of the present invention.

For each of injection-molded products thus manufactured, surface resistance (Ω/sq) was measured using a surface resistance measuring machine (ST-4 commercially available from SIMCO JAPAN), results of which are shown in FIG. 7.

Referring to FIG. 7, it was confirmed that, when a carbon nanotube agglomerate composed of, in a bundle form, a plurality of carbon nanotubes having an average inner diameter of 40% or more of an average outer diameter, a Raman spectroscopy intensity ratio of 1.0 or more and a carbon purity of 95% or more had an average bundle diameter of 1 μm or more, an average bundle length of 30 μm or more and an oxygen content of 0.5 wt % or less, a manufactured injection-molded product exhibited equivalent (Example 3 vs. Comparative Example 3) or reduced (Examples 1 and 2 vs. Comparative Examples 1 and 2) surface resistance and a minimum value thereof was about $10^4$ Ω/sq (Example 2) compared to when carbon nanotubes having properties outside the above ranges and an agglomerate thereof were used as a conductive filler.

In particular, by looking at the section in which a carbon nanotubes content is increased from 3 wt % to 4 wt %, it was confirmed that, when carbon nanotubes having properties outside the above ranges were used as a conductive filler, no change in surface resistance was observed (Comparative Example 1 vs. Comparative Example 3), and on the other hand, when carbon nanotubes having properties within the above ranges were used as a conductive filler, a rapid decrease in surface resistance was observed (Examples 1 vs. Example 3), which indicates that just a slight change in the carbon nanotubes content leads to significantly improved effects.

The above description of the present invention is only exemplary, and it will be understood by those skilled in the art that various modifications can be made without departing from the scope of the present invention and changing essential features. Therefore, the above-described embodiments should be considered as only illustrative in all aspects and not for purposes of limitation. For example, each component described as a single type may be realized in a distributed manner, and similarly, components that are described as being distributed may be realized in a combined manner.

The scope of the present invention is defined by the appended claims, and encompasses all modifications and alterations derived from meanings, the scope and equivalents of the appended claims.

What is claimed is:

1. A conductive resin composition, comprising:
a carbon nanotube agglomerate, in bundle form, comprising a plurality of carbon nanotubes having an average outer diameter ranging from 8 to 50 nm and an average inner diameter of 40% or more of the average outer diameter; and
an olefin-based polymer resin selected from the group consisting of high-density polyethylene, low-density polyethylene, linear low-density polyethylene, a polyethylene copolymer, polypropylene, and a mixture of two or more thereof,
wherein the carbon nanotubes have a Raman spectroscopy intensity ration ($I_G/I_D$) of 1.0 or more,
wherein the carbon nanotubes have a carbon purity of 95% or more,
wherein the carbon nanotube agglomerate has an average bundle length ranging from 40 to 60 μm,
wherein the carbon nanotube agglomerate comprises oxygen at a content of 0.5 wt % or less with respect to a total weight of the carbon nanotube agglomerate,
wherein the carbon nanotube agglomerate has an average bundle diameter ranging from 3 to 5 μm; and
wherein the carbon nanotube agglomerate is included at a content of 4 to 5 wt % with respect to a total weight of the conductive resin composition.

2. The conductive resin composition according to claim 1, wherein the polyethylene copolymer is one selected from the group consisting of ethylene vinyl acetate, ethylene butyl acrylate, ethylene ethyl acrylate, and a mixture of two or more thereof.

3. A plastic molded product comprising the conductive resin composition according to claim 1.

4. The plastic molded product according to claim 3, wherein the plastic molded product has a surface resistance ranging from $10^2$ to $10^{10}$ Ω/sq.

* * * * *